No. 847,414. PATENTED MAR. 19, 1907.
J. P. LAIN.
VEHICLE.
APPLICATION FILED JUNE 7, 1906.

Witnesses
Harry P. Lewhite
Ray White.

Inventor
James P. Lain.
By Morgan & Rubinstein Attys

UNITED STATES PATENT OFFICE.

JAMES P. LAIN, OF CHICAGO, ILLINOIS.

VEHICLE.

No. 847,414.

Specification of Letters Patent.

Patented March 19, 1907.

Application filed June 7, 1906. Serial No. 320,626.

*To all whom it may concern:*

Be it known that I, JAMES P. LAIN, a citizen of the United States, and residing at 717 West Forty-sixth Place, in the city of Chicago, county of Cook, and State of Illinois, have invented a new and useful Improvement in Vehicles, of which the following is a specification.

The invention relates to improvements in vehicles, and more particularly to a wagon adapted to utilize its own momentum as auxiliary motive power.

In wagons as heretofore constructed no means have been provided for applying their momentum to assist in the propulsion over difficult places, and as a consequence it is ofttimes very difficult to pass the wheels over an obstruction in the road—such as a rut or stone, for instance.
The object of the invention is to provide a wagon in which the friction of the running-gear is reduced to a minimum, thereby greatly decreasing the power required for its propulsion, as well as diminishing the wear and necessity for repairs.

It is also an object of the invention to provide means whereby the momentum acquired by the wagon may be transformed into motive power and caused to assist in propelling the wagon over difficult places.

The invention consists in the matters hereinafter described, and more fully pointed out and defined in the appended claims.

Figure 1:
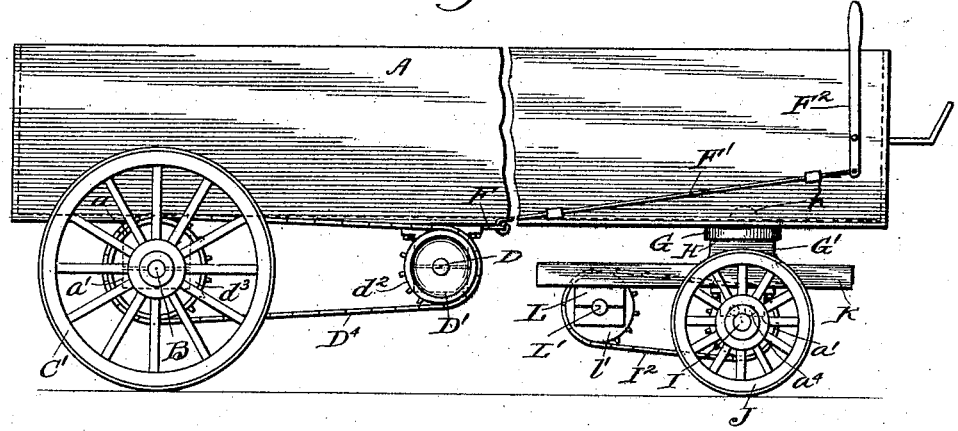
Figure 2:
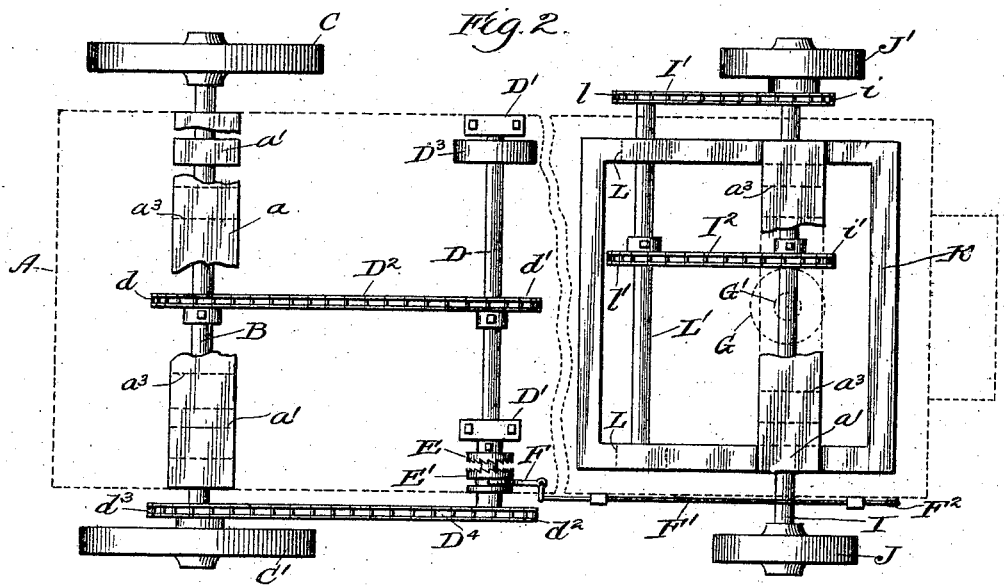
Figures 3, 4:
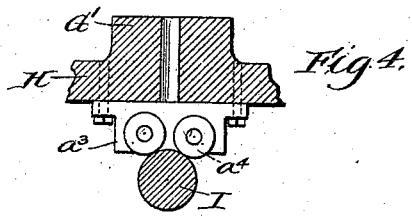

In the drawings, Figure 1 is a fragmentary side elevation of a device embodying my invention. Fig. 2 is a fragmentary top plan view of the same, showing the box in dotted lines. Fig. 3 is a vertical section of the rear axle and bolster, showing one of the end bearings for the axle in elevation. Fig. 4 is a similar view of the front axle and bolster, showing one of the auxiliary bearings in elevation.

As shown in said drawings, A represents the wagon-box, which may be of any desired size and material and which, as shown, is provided beneath its bottom and adjacent to its rear end with a transverse sill or beam affording the rear bolster $a$, on which the box is rigidly engaged in any preferred manner. Rigidly bolted at the ends of said bolster and beneath the same are the antifriction-bearings $a'$, in which the rear axle B is journaled and which, as shown more clearly in Fig. 3, comprises each a separable bearing-box containing a plurality of bearing rollers or pencils $a^2$, extending longitudinally of the axle, though obviously antifriction-bearings of any desired kind may be employed. Intermediate between said bearings $a'$ and the center of the axle are the auxiliary bearings $a^3$, each of which, as shown in Fig. 4, comprises a bearing-box rigidly bolted beneath the bolster and provided with a pair of rollers $a^4$, which project through the bottom of said box and engage the axle and act to prevent the bolster from bending centrally under a heavy load. Non-rotatively engaged on one end of said axle B is a wheel C, and rotatively engaged on the opposite side thereof is the wheel C'.

A transverse counter-shaft D is journaled beneath the box A in suitable bearings D', similar to the bearings $a'$. A sprocket-wheel $d$ of any desired size is rigidly engaged on the axle B centrally thereof, and a sprocket $d'$ is rigidly engaged on the counter-shaft in alinement therewith and is of smaller size, and a sprocket-chain $D^2$ is trained on said wheels and acts to rotate the counter-shaft at a greater speed than that of the axle. Said shaft, as shown, is provided with a balance-wheel $D^3$, and journaled at the end of said shaft adjacent the wheel C' is a sprocket-wheel $d^2$ in alinement with a sprocket-wheel $d^3$, rigidly engaged on the hub of the wheel C'. Said sprocket-wheels $d^2$ and $d^3$ correspond in size with the wheels $d'$ and $d$, respectively, and trained on the same is a sprocket-chain $D^4$.

For the purpose of locking the wheel C' to the axle B, I have provided a clutch on the shaft D, comprising a toothed clutch member E, which is rigidly engaged on said shaft D, and a complemental clutch member E', rigidly engaged on the hub of the sprocket-wheel $d^2$, which is slidable longitudinally of said shaft, thereby adapting said clutch member E' to be moved into and out of engagement with said member E. Said member E' is provided with a peripheral groove in which is engaged the forked end of a bell-crank lever F, pivoted on the bottom of the box A, the other end of which is connected with a rod F', slidably engaged in suitable bearings on the side of the wagon-box, and a lever $F^2$ is pivoted on the box and connected at its lower end with said rod and extends upwardly into position to be readily operated from the box.

The box A is provided near its forward end with a bearing-plate G, which is rigidly engaged on the under side of the box centrally thereof and rests upon a similar bearing-plate G', carried upon the bolster H. A king-bolt h extends downwardly through a suitable aperture through the bottom of the box, said bearing-plates, and bolster and affords the pivot for the front axle, as is usual in such devices. Said bolster H is provided on the under side thereof at its ends with bearings $a'$ and $a^3$, similar to the bearings on the rear axle, and journaled in said bearings is the forward axle I. The wheel J, diagonally opposite from the wheel C on the axle B, is rigidly fixed on said forward axle and rotative therewith, and the wheel J' is rotative on said axle. The hounds K comprise a rectangular frame which is rigidly engaged to the bolster H and extends rearwardly therefrom, and journaled in suitable bearings L on the under side of said hounds near the rear end thereof is a shaft L', on which is rigidly engaged two sprocket-wheels $l$ and $l'$, the former of which is at the end of the shaft and in alinement with a similar sprocket-wheel $i$, rigidly engaged on the hub of the wheel J', and the latter of which is in alinement with a sprocket-wheel $i'$, rigidly engaged on the axle I intermediate of its ends. Sprocket-chains I' and $I^2$ are trained on said sprocket-wheels and act to lock the wheels J and J' to rotate together.

The operation is as follows: Ordinarily when the speed is sufficient or when the load is light the clutch members are out of engagement, thereby permitting the rear wheels to rotate independently of each other. Before reaching an upward incline in the road, however, the speed of the vehicle is increased, thereby causing the balance-wheel $D^3$ to gain power, and as the incline is reached the clutch is thrown into operation, thereby locking the wheel C' to the axle and exerting the power of the balance-wheel on both of the rear wheels. Furthermore, should there be an obstruction in the road before one of said wheels the clutch is thrown into operation by its lever, thereby causing the rear wheels to rotate together, and the leverage exerted on the axle by the unobstructed wheel acts to assist in raising the other wheel over its obstruction.

Owing to the fact that there are two sets of antifriction-bearings for each axle, the load is evenly distributed throughout the length of the axle, thereby giving a large bearing-surface with but little friction and providing an easy draft.

While I have shown a sprocket connection between the front axle and the shaft L', which causes the front wheels to rotate together, it may obviously be dispensed with, if desired, and the forward wheels permitted to rotate independently of each other.

I claim as my invention—

1. In a vehicle of the class described the combination with the front and rear rotative axles of antifriction-bearings therefor, a box connecting said axles, wheels on the forward axle, a wheel rigidly engaged on one end of the rear axle, a wheel journaled on the opposite end of said axle, a counter-shaft, a balance-wheel thereon and means connecting said axle and shaft adapted to lock the loose wheel to the axle.

2. In a vehicle the combination with the bolsters of a box thereon, antifriction-bearings on said bolsters, axles journaled therein, wheels on the forward axle, a loose and a fixed wheel on the rear axle, a counter-shaft journaled beneath the box, a balance-wheel thereon, means connecting said axle and shaft and adapted to rotate the shaft at a greater speed than the speed of the axle and means for locking the loose wheel to the axle.

3. In a vehicle the combination with the axles of antifriction-bearings therefor, a box carried on said axles, wheels on the forward axle, a fixed and a loose wheel on the rear axle, a counter-shaft journaled beneath the box, a balance-wheel thereon, sprocket-wheels rigidly engaged on both the axle and the shaft, a sprocket-chain thereon, a sprocket-wheel on the loose wheel, a sprocket-wheel slidably and rotatably engaged on said shaft, a sprocket-chain connecting the same with the sprocket on the loose wheel, clutch members on said slidable sprocket-wheel and shaft and means for throwing said members into and out of engagement.

4. In a device of the class described the combination with the axles, of a plurality of antifriction-bearings therefor spaced throughout their lengths, a box connecting said axles, a rigid and a loose wheel on each axle, a counter-shaft journaled beneath the box, a balance-wheel thereon, sprocket connections between said axle and shaft, means for locking the loose wheel on the rear axle to said axle, hounds on the forward axle, a shaft journaled thereon, sprocket-wheels on said shaft, sprocket-wheels on the forward axle and the loose wheel thereon in alinement therewith and sprocket-chains on said sprocket-wheels.

JAMES P. LAIN.

Witnesses:
JOSEPH STAAB,
THOMAS J. MORGAN.